(12) United States Patent
Lu et al.

(10) Patent No.: US 11,675,461 B2
(45) Date of Patent: Jun. 13, 2023

(54) INFRARED TOUCH SCREEN BEZEL FOR INSTALLING FUNCTIONAL ASSEMBLY AND DISPLAY TERMINAL COMPRISING THE SAME

(71) Applicant: SHENZHEN KTC COMMERCIAL DISPLAY TECHNOLOGY CO., LTD., Guangdong (CN)

(72) Inventors: Wei Lu, Guangdong (CN); Meng Yang, Guangdong (CN); Zhenle Li, Guangdong (CN); Zhifeng Lin, Guangdong (CN); Wei Chen, Guangdong (CN); Xiaolin Wan, Guangdong (CN)

(73) Assignee: SHENZHEN KTC COMMERCIAL DISPLAY TECHNOLOGY CO., LTD., Shenzhen (CN)

( * ) Notice: Subject to any disclaimer, the term of this patent is extended or adjusted under 35 U.S.C. 154(b) by 163 days.

(21) Appl. No.: 17/463,520

(22) Filed: Aug. 31, 2021

(65) Prior Publication Data

US 2022/0035468 A1 Feb. 3, 2022

Related U.S. Application Data

(63) Continuation of application No. PCT/CN2020/108842, filed on Aug. 13, 2020.

(30) Foreign Application Priority Data

Jul. 29, 2020 (CN) .......................... 202010744637.7

(51) Int. Cl.
*G06F 3/042* (2006.01)
*G02B 5/20* (2006.01)
(Continued)

(52) U.S. Cl.
CPC ............. *G06F 3/042* (2013.01); *G02B 5/208* (2013.01); *H04N 23/54* (2023.01); *H04N 23/55* (2023.01); *H04N 23/57* (2023.01); *H04N 23/60* (2023.01)

(58) Field of Classification Search
CPC .... G06F 1/181; G06F 3/0421; G06F 3/04164; G06F 1/1605; G06F 3/042; H04N 23/60;
(Continued)

(56) References Cited

U.S. PATENT DOCUMENTS

| | | | |
|---|---|---|---|
| 8,405,636 B2 * | 3/2013 | Bridger | G06F 3/0421 345/166 |
| 8,405,637 B2 * | 3/2013 | Bridger | G06F 3/0421 345/166 |

(Continued)

FOREIGN PATENT DOCUMENTS

| | | | | |
|---|---|---|---|---|
| CN | 105474616 A | * | 4/2016 | ............... G02B 7/08 |
| CN | 110377188 A | * | 10/2019 | ............. G06F 3/042 |

(Continued)

*Primary Examiner* — Vinh T Lam

(57) ABSTRACT

Disclosed are an infrared touch screen bezel for installing a functional assembly and a display terminal including the same. The infrared touch screen bezel (10) includes a frame body (11), a first infrared base panel (12), and a second infrared base panel (13); the first infrared base panel (12) and the second infrared base panel (13) are both arranged in a cavity (101) of the frame body (11), and a functional assembly (30) is arranged in a gap between the first infrared base panel (12) and the second infrared base panel (13); the first infrared base panel (12) and the second infrared base panel (13) are electrically connected through a first flexible circuit board (14). The above-mentioned infrared touch screen bezel (10) may greatly reduce the width of the frame required to install a functional assembly without affecting the infrared touch function.

20 Claims, 3 Drawing Sheets

(51) Int. Cl.
*H04N 23/54* (2023.01)
*H04N 23/55* (2023.01)
*H04N 23/57* (2023.01)
*H04N 23/60* (2023.01)

(58) Field of Classification Search
CPC ........ H04N 23/57; H04N 23/51; H04N 23/55; H04N 23/54; G02B 5/208
See application file for complete search history.

(56) References Cited

U.S. PATENT DOCUMENTS

| | | | | |
|---|---|---|---|---|
| 8,902,201 B2 * | 12/2014 | Hung | ............. | G06F 3/0421 345/173 |
| 8,970,554 B2 * | 3/2015 | Jang | ............. | G06F 3/0428 345/175 |
| 9,354,749 B2 * | 5/2016 | Tsai | ............. | G06F 3/0421 |
| 9,417,735 B2 * | 8/2016 | Lin | ............. | G06F 3/0421 |
| 10,452,895 B1 * | 10/2019 | Tang | ............. | H04N 23/56 |
| 10,571,966 B2 * | 2/2020 | Wu | ............. | G06F 3/0412 |
| 10,911,654 B2 * | 2/2021 | Chang | ............. | H01L 27/14625 |
| 11,295,433 B2 * | 4/2022 | Jha | ............. | H04N 23/695 |
| 11,496,657 B2 * | 11/2022 | Lee | ............. | G03B 37/00 |
| 2014/0264036 A1 * | 9/2014 | Hung | ............. | G06F 3/0421 250/349 |
| 2015/0054789 A1 * | 2/2015 | Chang | ............. | G06F 3/0421 345/175 |
| 2015/0055211 A1 * | 2/2015 | Chang | ............. | G06F 3/04182 359/350 |
| 2019/0089880 A1 * | 3/2019 | Murao | ............. | H04N 23/57 |
| 2019/0285830 A1 * | 9/2019 | Nakamura | ............. | H04N 23/45 |
| 2021/0014416 A1 * | 1/2021 | Kim | ............. | H04N 23/951 |
| 2021/0263259 A1 * | 8/2021 | Seo | ............. | H04N 23/951 |
| 2022/0155418 A1 * | 5/2022 | Han | ............. | H04N 23/52 |

FOREIGN PATENT DOCUMENTS

| | | | | |
|---|---|---|---|---|
| CN | 108989506 B | * | 6/2020 | ............. G06F 1/1686 |
| WO | WO-2018130083 A1 | * | 7/2018 | ............. H04M 1/026 |
| WO | WO-2019050560 A1 | * | 3/2019 | ............. G06F 1/1656 |

* cited by examiner

INFRARED TOUCH SCREEN BEZEL FOR INSTALLING FUNCTIONAL ASSEMBLY AND DISPLAY TERMINAL COMPRISING THE SAME

CROSS-REFERENCE TO RELATED APPLICATION

The present application is a Continuation Application of PCT Application No. PCT/CN2020/108842 filed on Aug. 13, 2020, which is based on Chinese patent application No. 202010744637.7 filed on Jul. 29, 2020, and claims its priority. The entire disclosure of the application is incorporated herein by reference in its entirety.

FIELD OF TECHNOLOGY

The present disclosure relates to the technical field of display devices, in particular to an infrared touch screen bezel for installing a functional assembly and a display terminal comprising the same.

BACKGROUND TECHNOLOGY

Nowadays, display terminals with infrared touch screen have been more and more widely used. With the introduction of the concept of full-screen-display smartphones and an increasing demand for a better aesthetic design of the display terminals, the structure of infrared touch screens is required to enhance in order to meet the increasing demand for use. For example, in order to take photos using the display terminal, a functional assembly such as a camera assembly is required to be installed on the infrared touch screen, however, the functional assembly usually requires a certain space due to its large size, and it can only be arranged on the side of an infrared base panel of the infrared touch screen. As a result, the width of the frame of the infrared touch screen on the side where the functional assembly is installed is increased in order to provide more space for the functional assembly. The increase in the width of the frame of the display terminal conflicts with the user's desire for a narrow frame. Therefore, the problem of existing infrared touch screens with functional assemblies installed in the prior art is the wide frame.

SUMMARY

Embodiments of the present disclosure provides an infrared touch screen bezel for installing a functional assembly, aiming at solving the problem of a wide frame of infrared touch screens with functional assemblies installed in the prior art.

In a first aspect, an embodiment of the present disclosure provides an infrared touch screen bezel for installing a functional assembly, which includes: a frame body, a first infrared base panel, and a second infrared base panel;

the first infrared base panel and the second infrared base panel are both arranged in a cavity of the frame body, and a functional assembly is arranged in a gap between the first infrared base panel and the second infrared base panel;

a through-hole is provided on the frame body at a position facing the functional assembly, and a side opening in communication with the cavity is provided on a side of the frame body;

the first infrared base panel and the second infrared base panel are electrically connected through a first flexible circuit board.

Further, the first flexible circuit board is arranged and fitted along an outer wall of the frame body, and a middle section of the first flexible circuit board is bent and arranged on an upper side of the frame body.

Further, an optical filter strip is disposed on and fitted to an inner side of the first infrared base panel and the second infrared base panel.

Further, the functional assembly is a camera assembly, and a camera control board is fixedly arranged on the upper side of the frame body;

the camera assembly is electrically connected to the camera control board through a second flexible circuit board.

Further, the camera assembly includes a lens and a lens holder, the lens is mounted in a recess of the lens holder.

Further, hooks are provided on side walls of the lens holder, and each of the hooks is snapped into a groove provided on the frame body at a position corresponding to the each of the hooks to fix the lens holder.

Further, the camera control board is also provided with mounting holes, the camera control board is fixed on the upper side of the frame body by screwing screws into the mounting holes, and the middle section of the first flexible circuit board is located under the camera control board.

Further, the second flexible circuit board is vertically arranged along the outer wall of the frame body.

Further, a width of the infrared touch screen bezel is 8-20 mm.

In another aspect, an embodiment of the present disclosure also provides a display terminal, which includes the above-mentioned infrared touch screen bezel and an infrared touch screen enclosed by the infrared touch screen bezel, and the functional assembly is fixedly arranged on the infrared touch screen bezel.

The present disclosure provides an infrared touch screen bezel for installing a functional assembly and a display terminal including the same. The infrared touch screen bezel includes a frame body, a first infrared base panel, and a second infrared base panel; the first infrared base panel and the second infrared base panel are both arranged in a cavity of the frame body, and a functional assembly is arranged in a gap between the first infrared base panel and the second infrared base panel; the first infrared base panel and the second infrared base panel are electrically connected through a first flexible circuit board. The above-mentioned infrared touch screen bezel may greatly reduce the width of the frame required to install a functional assembly without affecting the infrared touch function, so that the infrared touch screen bezel for installing a functional assembly may have a narrow width.

BRIEF DESCRIPTION OF THE DRAWINGS

In order to more clearly illustrate the technical proposals of the present disclosure, the drawings used in the embodiments will be briefly described below. Apparently, the drawings in the following description are merely some embodiments of the present disclosure, those skilled in the art can obtain other drawings based on these drawings without creative work.

DETAILED DESCRIPTION OF THE EMBODIMENTS

The technical proposals in the embodiments of the present disclosure will be clearly and completely described in conjunction with the accompanying drawings in the embodiments of the present disclosure. It is apparent that the described embodiments are merely part of the embodiments of the present disclosure rather than all embodiments. Based on the embodiments of the present disclosure, all other embodiments obtained by those skilled in the art without creative work fall within the scope of protection of the present disclosure.

It should be understood that, when used in this specification and the appended claims, the terms "include" and "comprise" indicate the presence of the described features, integers, steps, operations, elements and/or components, but do not preclude the presence or addition of a plurality of other features, integers, steps, operations, elements, components, and/or collections thereof.

It should also be understood that the terms used in this description of the present disclosure is merely illustrative of the specific embodiments, but not intended to limit the scope of the present disclosure. As used in the specification and the appended claims of the present disclosure, unless the context clearly indicates otherwise, the singular forms "a", "an" and "the" are intended to include plural forms.

It should be further understood that the term "and/or" used in the specification and appended claims of the present disclosure refers to any combination of one or more of the items listed in the associated and all possible combinations, and includes these combination.

Figure 1:
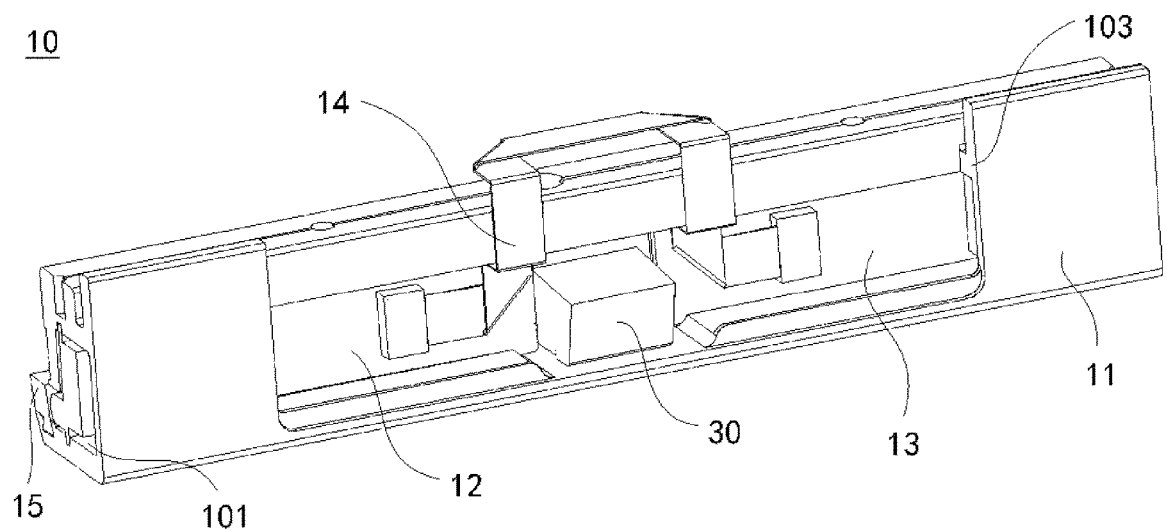
FIG. 1 is a structural view of the infrared touch screen bezel for installing a functional assembly provided by an embodiment of the present disclosure.
Figure 2:
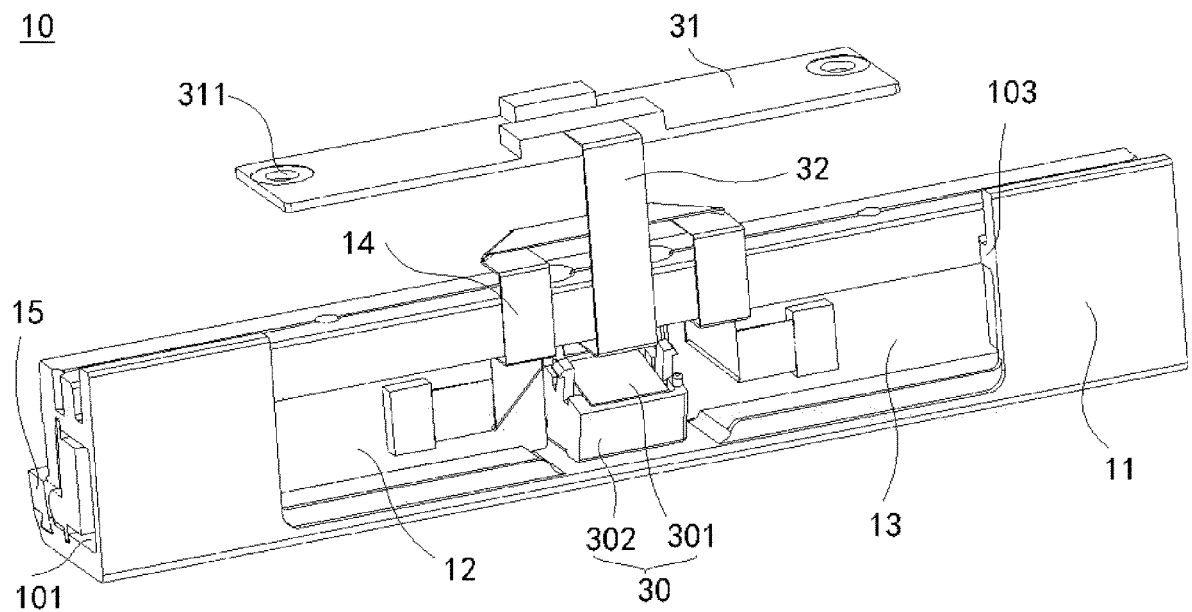
FIG. 2 is another structural view of the infrared touch screen bezel for installing a functional assembly provided by the embodiment of the present disclosure.
Figure 3:
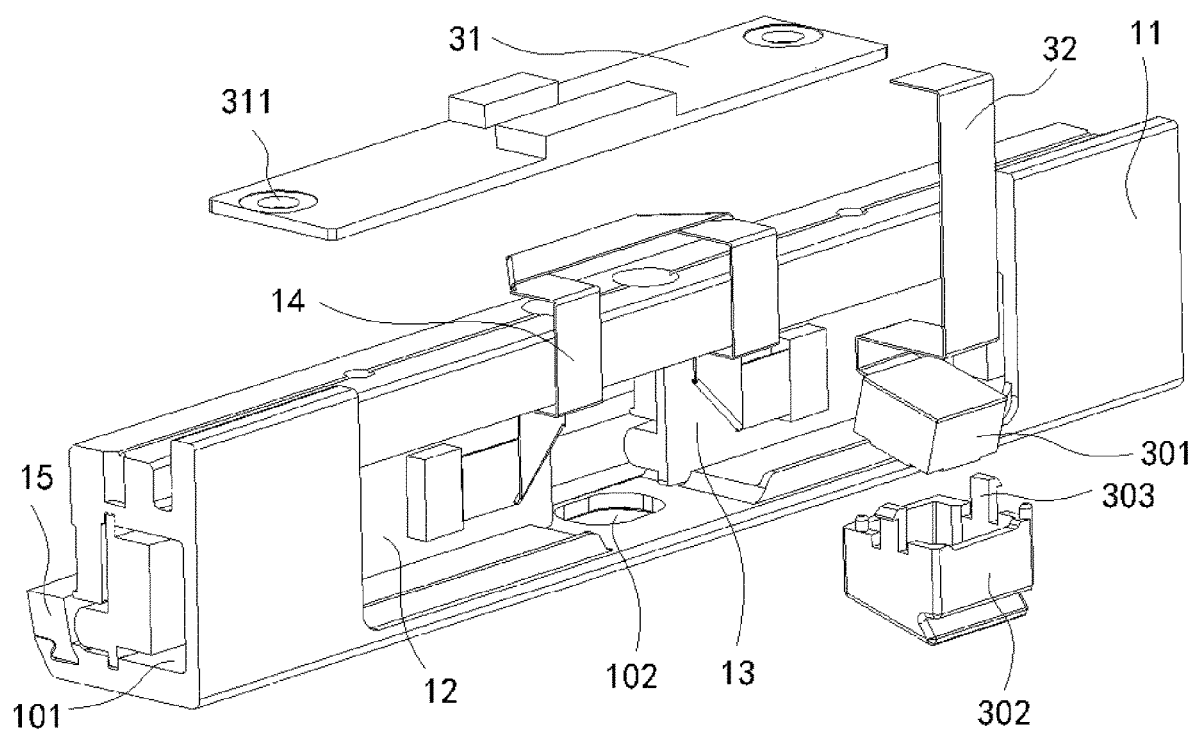
FIG. 3 is an exploded view of the infrared touch screen bezel for installing a functional assembly provided by the embodiment of the present disclosure.
Figure 4:
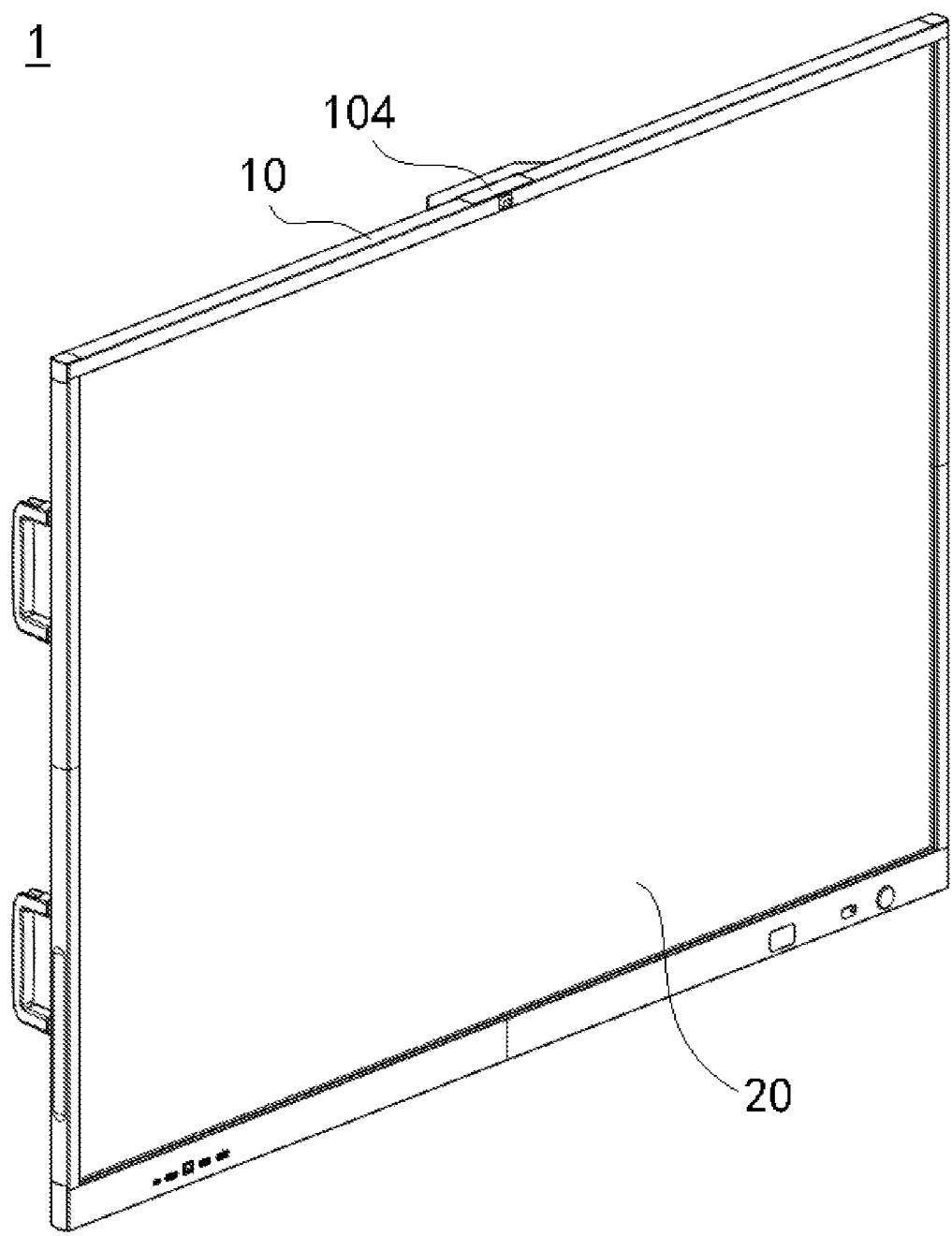
FIG. 4 is a structural view of the display terminal provided by an embodiment of the present disclosure.

Referring to FIGS. 1 to 4, FIG. 1 is a structural view of the infrared touch screen bezel for installing a functional assembly provided by an embodiment of the present disclosure; FIG. 2 is another structural view of the infrared touch screen bezel for installing a functional assembly provided by the embodiment of the present disclosure; FIG. 3 is an exploded view of the infrared touch screen bezel for installing a functional assembly provided by the embodiment of the present disclosure; and FIG. 4 is a structural view of the display terminal provided by an embodiment of the present disclosure. As shown in the figures, the infrared touch screen bezel 10 includes a frame body 11, a first infrared base panel 12, and a second infrared base panel 13, the first infrared base panel 12 and the second infrared base panel 13 are both arranged in a cavity 101 of the frame body 11, and a functional assembly 30 is arranged in a gap between the first infrared base panel 12 and the second infrared base panel 13. A through-hole 102 is provided on the frame body 11 at a position facing the functional assembly 30, and a side opening 103 in communication with the cavity 101 is provided on a side of the frame body 11. The first infrared base panel 12 and the second infrared base panel 13 are electrically connected through a first flexible circuit board 14. In addition, a cover 104 may also be arranged to cover the side opening 103, so that the cover 104 and a side surface of the frame body 11 form a flat surface. During manufacturing, the functional assembly 30 can be easily installed through the side opening 103, and the cover 104 can be covered on the side opening 103 after the installation is completed. The infrared touch screen bezel 10 can be used as the frame of display terminals such as mobile phones, tablet computers, and touch-control displays. The display terminals using the infrared touch screen bezel 10 has an infrared touch-control function, so that users can perform touch control by fingers, stylus, and the like on the infrared touch screen. Specifically, the frame body 11 may be manufactured by integrally forming metal alloy materials such as aluminum alloy and stainless steel. A cavity 101 for accommodating the first infrared base panel 12 and the second infrared base panel 13 is formed inside the frame body 11. The first infrared base panel 12 and the second infrared base panel 13 have a gap therebetween for placing the functional assembly 30. The first infrared base panel 12 and the second infrared base panel 13 are electrically connected through the first flexible circuit board 14. The first flexible circuit board 14 is a flexible printed circuit (FPC), which has excellent properties of thin thickness, good flexibility and bendability. The functional assembly may be an assembly with auxiliary function such as a camera assembly, a power button assembly, a microphone assembly, an NFC assembly, a remote control assembly, and the like, such that the display terminal have corresponding functions after the functional assembly is installed. The position of the through-hole 102 on the frame body 11 may be arranged according to a specific functional assembly provided. The position of the through-hole 102 on the frame body 11 may be arranged according to a specific functional assembly provided.

In the existing designs, the functional assembly 30 is generally installed on a side of the infrared base panel with additional width required. Since the functional assembly 30 has a large size, this design causes the bezel on which the functional assembly 30 is installed becomes wider. Whereas, the functional assembly 30 in the present disclosure is positioned in the gap between the first infrared base panel 12 and the second infrared base panel 13. The first infrared base panel 12 and the second infrared base panel 13 are electrically connected through the first flexible circuit board 14, therefore, the additional width of the bezel required to install the functional assembly 30 may be greatly reduced without affecting the original functions of the first and second infrared base panels. The width of the bezel with the functional assembly 30 installed is only increased by 1.5-6 mm compared with that without the functional assembly 30, so that the infrared touch screen bezel 10 with the functional assembly 30 installed also has a narrow frame design.

Specifically, the first infrared base panel 12 and the second infrared base panel 13 are each provided with a plurality of infrared lamp beads. Infrared rays are emitted by the infrared lamp beads, and are received by an infrared receiver located on the other side of the frame body opposite to the first infrared base panel 12 and the second infrared base panel 13, forming an infrared light path. When the user performs a touch operation on the infrared touch screen, the infrared light in the infrared light path passing the touch point is blocked, and cannot be received by the infrared receiver on the blocked infrared light path, so that the blocked infrared light path is obtained according to a change in the strength of the infrared signal received by the infrared receiver, and the coordinate of the touch point can be accurately positioned by further analysis.

More specifically, the first flexible circuit board 14 is arranged and fitted along an outer wall of the frame body 11, and a middle section of the first flexible circuit board 14 is bent and arranged on an upper side of the frame body 11. Due to its thin thickness and good flexibility and bendability, the first flexible circuit board 14 can be bent and fitted along the outer wall of the frame body 11, and the middle section of the first flexible circuit board 14 can be bent and arranged on an upper side of the frame body 11.

Furthermore, an optical filter strip 15 is disposed on and fitted to an inner side of the first infrared base panel 12 and the second infrared base panel 13. Specifically, the optical filter strip 15 is closely fitted to the infrared lamp beads on the first infrared base panel 12 and the second infrared base panel 13. The optical filter strip is closely fitted to the plurality of the infrared lamp beads provided on both of the first infrared base panel 12 and the second infrared base panel 13, so that the optical filter strip 15 can be used to filter the infrared rays emitted by the infrared lamp beads, in order to further improve the sensitivity of the infrared receiver to the intensity of the infrared signal, thereby increasing the accuracy of positioning the coordinate of the touch point.

Furthermore, the functional assembly 30 is a camera assembly, and a camera control board 31 is fixedly arranged on the upper side of the frame body 11. The camera assembly 30 is electrically connected to the camera control board 31 through a second flexible circuit board 32. The camera control board 31 is fixedly arranged on the upper side of the frame body 11, and the camera assembly is electrically connected to the camera control board 31 through the second flexible circuit board 32. The camera control board 31 is fixedly arranged on the upper side of the frame body 11 to reduce the width of the bezel that is required, and the camera assembly is electrically connected to the camera control board 31 through the second flexible circuit board 32. The second flexible circuit board 32 is also a flexible printed circuit (FPC), which has excellent properties of thin thickness, good flexibility and bendability. The functional assembly in the present disclosure is positioned in the gap between the first infrared base panel 12 and the second infrared base panel 13, and the first infrared base panel 12 and the second infrared base panel 13 are electrically connected through the first flexible circuit board 14. Therefore, the additional width of the bezel required to install the functional assembly may be greatly reduced without affecting the original functions of the first and second infrared base panels 12 and 13. The camera control board 31 is fixedly arranged on the upper side of the frame body 11, such that no additional bezel width is required for the installation. The width of the bezel with the functional assembly and the camera control board 31 installed is only increased by 1.5-6 mm compared with that without the functional assembly, so that the infrared touch screen bezel 10 with the functional assembly installed also has a narrow frame design.

Furthermore, the camera assembly includes a lens 301 and a lens holder 302, the lens 301 is mounted in a recess of the lens holder 302. Hooks 303 are provided on side walls of the lens holder 302, and each of the hooks 303 is snapped into a groove (not shown) provided on the frame body 11 at a position corresponding to each of the hooks 303 to fix the lens holder 302. The lens 301 is mounted on the lens holder 302, the side walls of the lens holder 302 are provided with the hooks 303, and the groove is provided on the frame body 11, so that the lens 301 is firmly fixed on frame body 11 through the lens holder 302 to prevent the lens 301 from detaching. Two hooks 303 are provided on left and right side walls of the lens holder 302 in FIG. 3, and the hooks 303 may also be provided on all four side walls of the lens holder 302 to further secure the lens 301.

More specifically, the first flexible circuit board 14 is arranged and fitted along the outer wall of the frame body 11, and the middle section of the first flexible circuit board 14 is located under the camera control board 31. Moreover, the camera control board 31 is also provided with mounting holes 311, the camera control board 31 is fixed on the upper side of the frame body 11 by screwing screws into the mounting holes 311. Since the first flexible circuit board 14 has a thin thickness and good flexibility and bendability, the first flexible circuit board 14 can be bent and fitted along the outer wall of the frame body 11, and the middle section of the first flexible circuit board 14 may be arranged under the camera control board 31. The camera control board 31 is displaced on the middle section of the first flexible circuit board 14 to fix the first flexible circuit board 14, and the camera control board 31 is fixed by screwing screws into the mounting holes 311 provided on the camera control board 31. The mounting holes 311 may be countersunk screw holes, and the countersunk screw holes may further reduce the thickness of the infrared touch screen bezel 10. In addition, a hook may be provided on a lower end surface of the camera control board 31 to be engaged with a corresponding bayonet on the upper side of the frame body 11 to fix the camera control board 31.

More specifically, the second flexible circuit board 32 is vertically arranged along the outer wall of the frame body 11. With the second flexible circuit board 32 being vertically arranged along the outer wall of the frame body 11, The vertical sections of the first flexible circuit board 14 are located on both sides of the second flexible circuit board 32, and the second flexible circuit board 32 and the first flexible circuit board 14 are not overlapped, which avoids interference between the second flexible circuit board 32 and the first flexible circuit board 14, thereby improving the reliability of the electrical connection therebetween.

Furthermore, the width of the infrared touch screen bezel 10 is 8-20 mm, and a spacing between the first infrared base panel 12 and the second infrared base panel 13 is 6-20 mm. During implementation, the width of the infrared touch screen bezel 10 is mainly determined by the widths of the first infrared base panel 12 and the second infrared base panel 13, and is also affected by the size of the functional assembly 30. By optimizing the structure, the width of the infrared touch screen bezel 10 with the functional assembly 30 installed may be 8-20 mm, and the functional assembly 30 can be positioned in the spacing between the first infrared base panel 12 and the second infrared base panel 13, and the spacing may be adjusted according to the size of the functional assembly 30. Specifically, the spacing between the first infrared base panel 12 and the second infrared base panel 13 may be 6-20 mm.

An embodiment of the present disclosure further provides a display terminal. FIG. 4 is a structural view of the display terminal provided by an embodiment of the present disclosure. The display terminal 1 includes the above-mentioned infrared touch screen bezel 10 and an infrared touch screen 20 enclosed by the infrared touch screen bezel 10. That is, the above-mentioned infrared touch screen bezel 10 serves as the bezel and the infrared touch screen 20 serves as the screen of the display terminal 1. The functional assembly 30 and the camera control board 31 are fixedly arranged on the infrared touch screen bezel 10, and the specific arrangement is as shown in FIGS. 1 to 3.

In the infrared touch screen bezel for installing a functional assembly and a display terminal including the same provided by the present disclosure, the infrared touch screen bezel includes a frame body, a first infrared base panel, and a second infrared base panel; the first infrared base panel and the second infrared base panel are both arranged in a cavity of the frame body, and a functional assembly is arranged in a gap between the first infrared base panel and the second infrared base panel; the first infrared base panel and the second infrared base panel are electrically connected through a first flexible circuit board. The above-mentioned infrared touch screen bezel may greatly reduce the width of the frame required to install a functional assembly without affecting the infrared touch function, so that the infrared touch screen bezel for installing a functional assembly may have a narrow width.

The above are merely examples of the present disclosure, but are not intended to limit the scope of this disclosure. Various equivalent changes or substitutions may be made within the technical scope disclosed in the present disclosure by those skilled in the art, and these changes or substitutions shall fall within the scope of the present disclosure. The scope of protection of this disclosure is defined by the appended claims.

What is claimed is:

1. An infrared touch screen bezel for installing a functional assembly, comprising: a frame body, a first infrared base panel, and a second infrared base panel;
   wherein the first infrared base panel and the second infrared base panel are both arranged in a cavity of the frame body, and a functional assembly is arranged in a gap between the first infrared base panel and the second infrared base panel;
   a side opening in communication with the cavity is provided on a side of the frame body;
   the first infrared base panel and the second infrared base panel are electrically connected through a first flexible circuit board.

2. The infrared touch screen bezel for installing a functional assembly of claim 1, wherein the first flexible circuit board is arranged and fitted along an outer wall of the frame body, and a middle section of the first flexible circuit board is bent and arranged on an upper side of the frame body.

3. The infrared touch screen bezel for installing a functional assembly of claim 2, wherein an optical filter strip is disposed on an inner side of the first infrared base panel and the second infrared base panel and fitted thereto.

4. The infrared touch screen bezel for installing a functional assembly of claim 1, wherein the functional assembly is a camera assembly, and a camera control board is fixedly arranged on an upper side of the frame body, a through-hole matching the camera assembly is provided on the frame body, and
   the camera assembly is electrically connected to the camera control board through a second flexible circuit board.

5. The infrared touch screen bezel for installing a functional assembly of claim 2, wherein the functional assembly is a camera assembly, and a camera control board is fixedly arranged on the upper side of the frame body, a through-hole matching the camera assembly is provided on the frame body, and
   the camera assembly is electrically connected to the camera control board through a second flexible circuit board.

6. The infrared touch screen bezel for installing a functional assembly of claim 3, wherein the functional assembly is a camera assembly, and a camera control board is fixedly arranged on the upper side of the frame body, a through-hole matching the camera assembly is provided on the frame body, and
   the camera assembly is electrically connected to the camera control board through a second flexible circuit board.

7. The infrared touch screen bezel for installing a functional assembly of claim 4, wherein the camera assembly comprises a lens and a lens holder, the lens is mounted in a recess of the lens holder.

8. The infrared touch screen bezel for installing a functional assembly of claim 7, wherein hooks are provided on side walls of the lens holder, and each of the hooks is snapped into a groove provided on the frame body at a position corresponding to the each of the hooks to fix the lens holder.

9. The infrared touch screen bezel for installing a functional assembly of claim 8, wherein the camera control board is further provided with mounting holes, the camera control board is fixed on the upper side of the frame body by screwing screws into the mounting holes, and the middle section of the first flexible circuit board is located under the camera control board.

10. The infrared touch screen bezel for installing a functional assembly of claim 9, wherein the second flexible circuit board is vertically arranged along the outer wall of the frame body.

11. The infrared touch screen bezel for installing a functional assembly of claim 10, wherein a width of the infrared touch screen bezel is 8-20 mm.

12. An infrared touch screen bezel for installing a functional assembly, comprising: a frame body, a first infrared base panel, and a second infrared base panel;
    wherein the first infrared base panel and the second infrared base panel are both arranged in a cavity of the frame body, and a functional assembly is arranged in a gap between the first infrared base panel and the second infrared base panel;
    a through-hole is provided on the frame body at a position facing the functional assembly, and a side opening in communication with the cavity is provided on a side of the frame body;
    the first infrared base panel and the second infrared base panel are electrically connected through a first flexible circuit board.

13. The infrared touch screen bezel for installing a functional assembly of claim 12, wherein the first flexible circuit board is arranged and fitted along an outer wall of the frame body, and a middle section of the first flexible circuit board is bent and arranged on an upper side of the frame body.

14. The infrared touch screen bezel for installing a functional assembly of claim 13, wherein an optical filter strip is disposed on an inner side of the first infrared base panel and the second infrared base panel and fitted thereto.

15. The infrared touch screen bezel for installing a functional assembly of claim 12, wherein the functional assembly is a camera assembly, and a camera control board is fixedly arranged on an upper side of the frame body, and
    the camera assembly is electrically connected to the camera control board through a second flexible circuit board.

16. The infrared touch screen bezel for installing a functional assembly of claim 15, wherein the camera assembly comprises a lens and a lens holder, the lens is mounted in a recess of the lens holder.

17. The infrared touch screen bezel for installing a functional assembly of claim 16, wherein hooks are provided on side walls of the lens holder, and each of the hooks is snapped into a groove provided on the frame body at a position corresponding to the each of the hooks to fix the lens holder.

18. The infrared touch screen bezel for installing a functional assembly of claim 17, wherein the camera control board is further provided with mounting holes, the camera control board is fixed on the upper side of the frame body by screwing screws into the mounting holes, and the middle section of the first flexible circuit board is located under the camera control board.

19. A display terminal, comprising the infrared touch screen bezel for installing a functional assembly of claim 1, and an infrared touch screen enclosed by the infrared touch screen bezel, the functional assembly is fixedly arranged on the infrared touch screen bezel.

20. A display terminal, comprising the infrared touch screen bezel for installing a functional assembly of claim 12, and an infrared touch screen enclosed by the infrared touch screen bezel, the functional assembly is fixedly arranged on the infrared touch screen bezel.

* * * * *